Dec. 10, 1935. R. S. NELSON 2,023,968
RECTIFIER FOR ABSORPTION REFRIGERATING APPARATUS
Filed Nov. 15, 1933 2 Sheets-Sheet 1
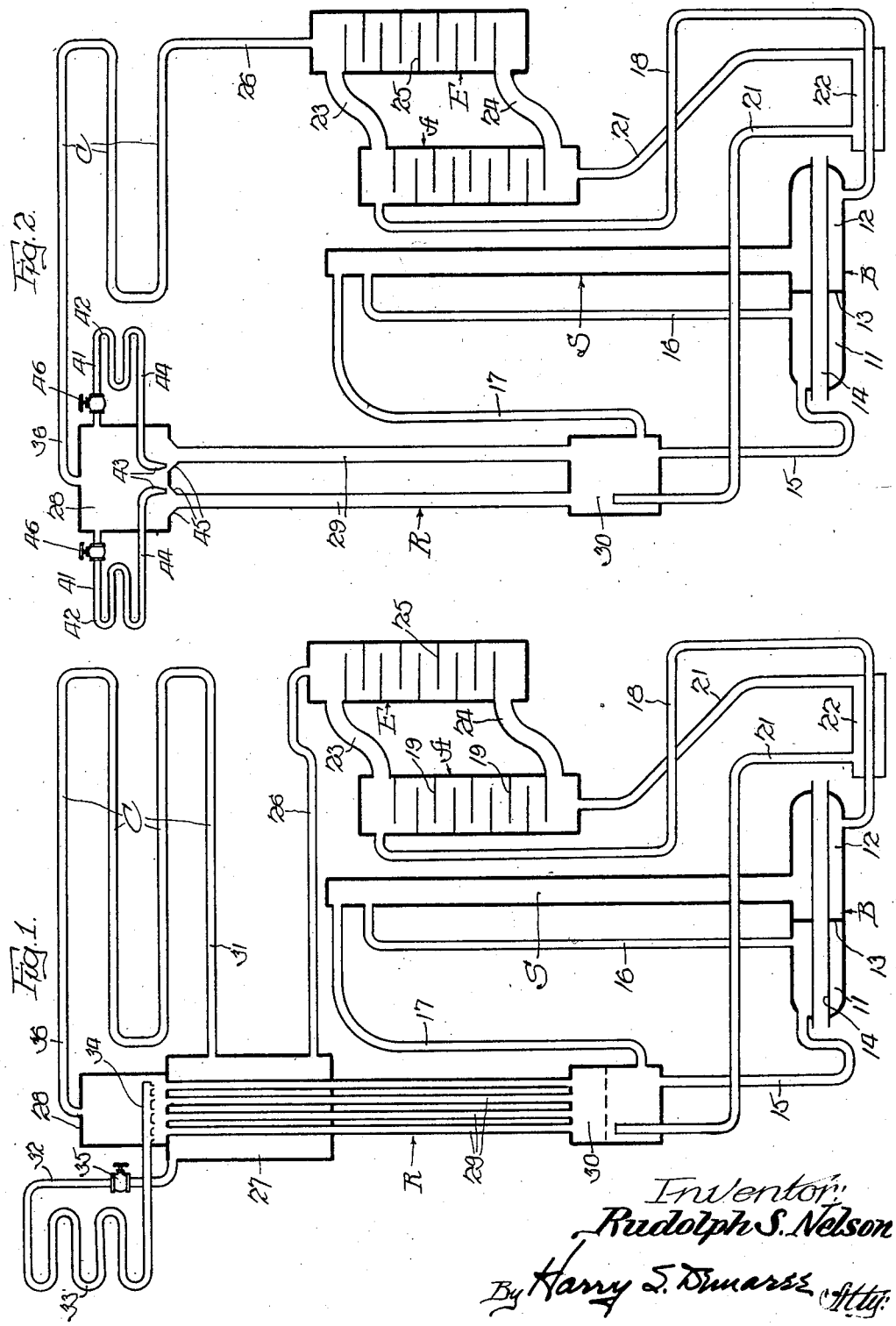
Inventor:
Rudolph S. Nelson
By Harry S. Demarest Atty.

Dec. 10, 1935.  R. S. NELSON  2,023,968
RECTIFIER FOR ABSORPTION REFRIGERATING APPARATUS
Filed Nov. 15, 1933  2 Sheets-Sheet 2

Inventor:
Rudolph S. Nelson.
By Harry J. Demarse, Atty.

Patented Dec. 10, 1935

2,023,968

UNITED STATES PATENT OFFICE 2,023,968

RECTIFIER FOR ABSORPTION REFRIGERATING APPARATUS

Rudolph S. Nelson, Rockford, Ill., assignor to The Hoover Company, North Canton, Ohio, a corporation of Ohio Application November 15, 1933, Serial No. 698,045

10 Claims. (Cl. 62—119.5)

This invention relates to absorption refrigerating apparatus and more particularly to rectifiers or the like for separating refrigerant vapor from absorption liquid vapor.

In absorption refrigerating apparatus employing a refrigerant and a volatile solvent, the operation and efficiency is affected greatly by the quantity of absorbent that passes with the refrigerant from the boiler to the condenser and into the evaporator. It is known to employ rectifiers cooled to a temperature below that of the boiler, so that the absorbent vapor is condensed out of the refrigerant vapor prior to its passage to the condenser. For cooling the rectifier, water, air and other fluids have been employed in the quantity and at the temperature requisite to maintain the desired temperature in the rectifier. By this method, however, the degree of separation is unsatisfactory. Likewise an undesirably large quantity of refrigerant may be condensed and dissolved by the condensed absorbent thus resulting in wasteful and inefficient operation. This is the case where ammonia and water are employed, as the refrigerant and absorbent in an absorption refrigerator, especially where it is necessary to employ low evaporator temperatures where air or relatively warm water is used to cool the absorber and condenser.

It is an object of the present invention to improve the method and means for removing absorption liquid vapor from refrigerant vapor expelled in the boiler of an absorption refrigerating system so as to improve the operation of the system and enable the system to produce reasonably low evaporator temperatures even tho the condenser and absorber operate at rather high temperatures.

Other objects and advantages reside in certain novel features of the arrangement and construction of parts as will be apparent from the following description taken in connection with the accompanying drawings in which:

Fig. 1 is a diagrammatic representation of a continuous absorption refrigerating system having separating means constructed in accordance with the principles of the present invention incorporated therein;

Fig. 2 is a diagram of a continuous absorption refrigerating apparatus having a modified form of the invention incorporated therein.

Figure 3:
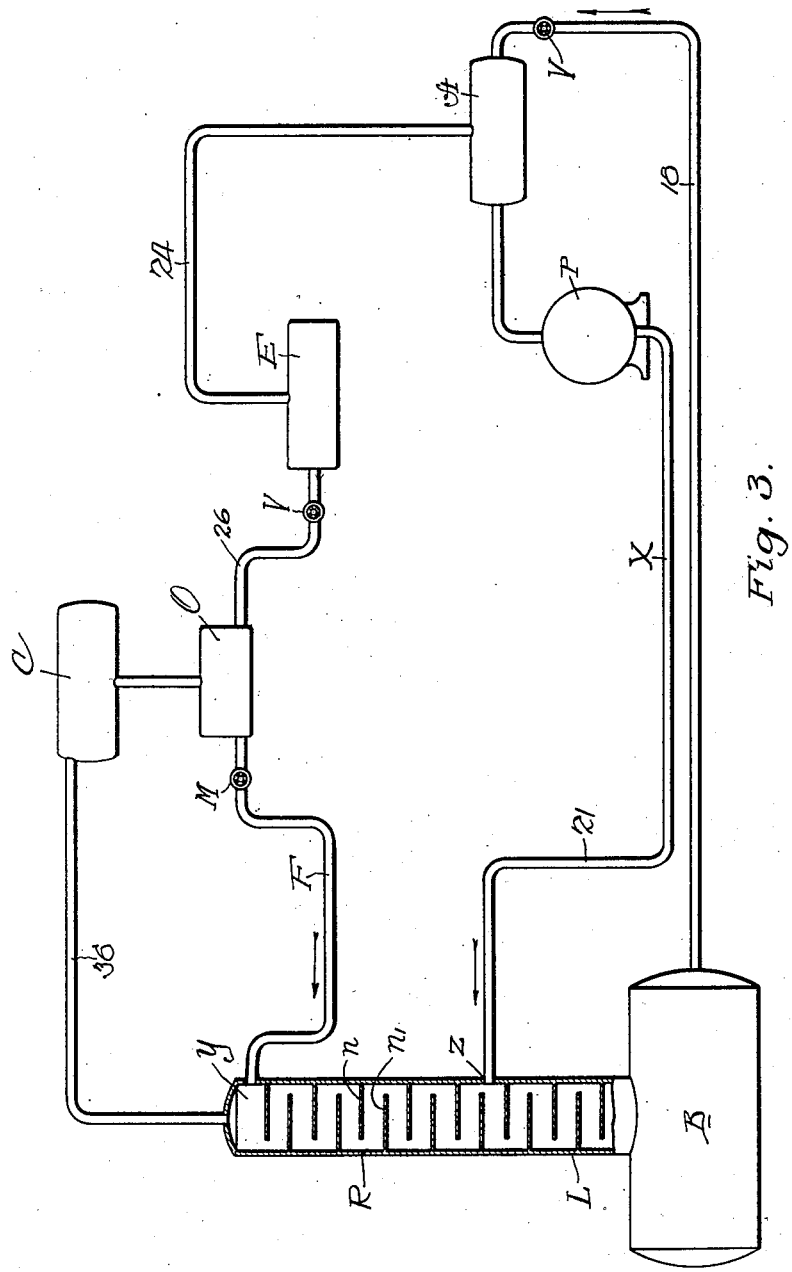
Fig. 3 is a diagram of a continuous absorption refrigerating system in which a still further modification of the invention is incorporated.

Referring in detail to the embodiment of the invention disclosed in Fig. 1 it will be seen that a continuous absorption refrigerating system is there illustrated as consisting of a boiler B, an absorber A, evaporator E, condenser C, a rectifier R and a gas separation chamber S, these parts being connected by various conduits as shown to form a complete refrigerating system.

Boiler B is illustrated as consisting of a closed horizontal cylinder in which two chambers 11 and 12 are provided by means of a partition 13. Tube 14 extends horizontally through both chambers 11 and 12 and provides means for supplying heat to liquids in the chambers 11 and 12. The left hand end of the chamber 11 is connected to the lower end of the rectifier R by means of a U-tube 15 which conveys liquid from the rectifier R to the boiler.

A gas lift pump conduit 16 of the usual type is connected to the top of the chamber 11 and conveys gas and liquid from the chamber 11 into the gas separation chamber S. The gas separation chamber S is merely a vertical cylinder connected at its top by means of a conduit 17 to the lower end of the rectifier R and at its lower end to the chamber 12 of the boiler. The lower end of the chamber 12 is connected by means of a conduit 18 to the top of the absorber A. The absorber A is merely a vertical vessel provided with a number of baffle plates 19. The lower end of the absorber A is connected to the lower end of the rectifier R by means of the conduit 21, a portion of the conduits 21 and 18 being in heat exchange relation as shown at 22.

The absorber is connected to the evaporator in the arrangement shown by two gas conduits 23 and 24 which may, of course, be in heat exchange relation in accordance with known practices, but which are not so illustrated in the drawings, inasmuch as this feature is not related to the present invention.

Like the absorber, the evaporator is merely a vertical cylinder provided with a number of baffle plates 25 therein. Refrigerant liquid is supplied to the top of the evaporator from the condenser C by means of a conduit 26, the flow of refrigerant from the condenser C to the conduit 26 being through a jacket 27 surrounding a portion of the rectifier R for purposes which will presently be described.

The rectifier proper, designated in general by the reference numeral R consists of three parts, namely, the upper chamber 28, a number of parallel vertically extending tubes 29 and a lower chamber 30. The tubes 29 connect the upper chamber 28 to the lower chamber 30 and provide means for conducting vapor from the chamber 30 to the chamber 28 and for conducting liquid from the chamber 28 to the chamber 30.

The jacket 27 mentioned above surrounds the upper portion of the tube 29 just below the chamber 28. Liquid refrigerant is fed into the jacket 27 by means of the conduit 31 connected to the condenser C. The liquid is drained out of the bottom of the jacket 27 by means of the conduit 26 mentioned above. At a point above the point of connection of the liquid refrigerant supply conduit 31 on the jacket 27 a conduit 32 is connected. This conduit passes upwardly to the top of a small auxiliary or reflux condenser 33, which may consist merely of a reversely bent pipe as shown. The lower end of the reflux condenser 33 passes into the chamber 28 of the rectifier and is there connected to a rose or other distributing means 34 for distributing liquid into the various tubes 29. The conduit 32 may be provided with a restriction or with a valve as indicated in 35 to regulate the passage of gas upwardly therethrough.

Inasmuch as the system disclosed is of the type using an inert gas as an auxiliary pressure equalizing agent, some inert gas may find its way into the main condenser C, and into the reflux condenser 33 (or into the condenser 44 of Fig. 2 referred to hereinafter). The inert gas should be vented from the condensers. Since means for venting the inert gas from the condenser into other parts of the system are now well known and since the drawings are only diagrammatic, the venting means has not been shown.

Assuming that the apparatus is charged in accordance with known practices, with ammonia as refrigerant, water as absorption liquid and hydrogen as inert gas, three cycles of circulation are set up upon heat being applied to the boiler B.

Absorption liquid supplied to the chamber 11 of the boiler through the conduit 15 passes upwardly through the gas lift pump conduit 16 being lifted in this conduit by the bubbles generated in chamber 11, and then flows downwardly through the gas separation chamber S, the chamber 12 of the boiler and into the absorber through the conduit 18. After trickling downwardly over the baffle plates 19 in the absorber, the absorption liquid flows through the conduit 21 into the lower chamber 30 of the rectifier R. It then returns to the chamber 11 of the boiler through the conduit 15. The level in the separator S is sufficiently high to enable the liquid to flow from it into the absorber. Likewise the absorber is located above the vessel 30 so that the liquid may flow from the absorber into this vessel and from it into the chamber 11 of the boiler B.

At the same time gas generated in the chambers 11 and 12 of the boiler B passes into the gas separation chamber S, that from the chamber 11 passing through the conduit 16 and that from the chamber 12 merely rising to the gas separation chamber. From the gas separation chamber S the gases flow through the conduit 17 into the lower chamber 30 of the rectifier. Since absorption liquid stands in this vessel at approximately the height indicated by the dash lines the gases or vapors fed through the chamber 30 by the conduit 17 bubbles upwardly through this liquid and then passes upwardly through the tubes 29 into the upper chamber 28 of the rectifier. The upper chamber 28 of the rectifier being connected by means of conduit 36 to the condenser C, vapor passes from this chamber into the condenser C and is there changed to its liquid phase upon giving up heat to some cooling medium, preferably air.

The condensed refrigerant is then fed into the jacket 27 by means of the conduit 31. In the jacket 27 some refrigerant is vaporized due to the passage of heat from the fluids in the tubes 29 to the liquid refrigerant in the jacket 27. At the same time some of the vapor may be condensed in the tubes 29, thus providing a quantity of reflux in each tube. The portion of the refrigerant vaporized in the jacket 27 passes upwardly through the conduit 32, to be again condensed in the auxiliary or reflux condenser 33 and distributed into the tubes 29 by means of the rose 34. Here the ascending vapor is brought into intimate contact with the film of reflux descending on the inner wall of the tube. In effect this arrangement provides, for the length of the tube employed, the equivalent of an infinite number of plates without excessive back pressure and with little or no possibility of entrainment of liquid. After trickling downwardly through the tubes 29 the reflux passes with the liquid in the lower chamber 30 of the rectifier back to the boiler through the conduit 15.

The unevaporated portion of the refrigerant in the jacket 27 passes through the conduit 26 into the evaporator E. As it trickles downwardly over the baffle plate 25 in the evaporator the refrigerant is evaporated to produce a cooling effect. It is then conveyed by the inert gas into the absorber A. In the absorber the refrigerant is absorbed by the absorption liquid and conveyed back to the boiler through the conduit 21, lower chamber 30 of the rectifier and the conduit 15.

By any known means available to those skilled in the art the inert gas may be circulated between the absorber and the evaporator. In the arrangement shown, the cycle is upwardly in the absorber thence through the conduit 23 into the evaporator, downwardly in the evaporator and back to the absorber through the conduit 24.

Referring now to the embodiment shown in Figure 2 of the drawings it is seen that except for the rectifier and the manner in which it is connected to the other parts of the apparatus, the system is the same as that disclosed in Figure 1. Accordingly the same reference characters have been used to designate the various parts, and it is unnecessary to repeat here a description of the general operation of the unit.

The rectifier R of the arrangement of Figure 2, like the rectifier of Figure 1 may be said to be composed of three parts, an upper chamber 28, a plurality of vertically disposed parallel tubes 29 and a lower chamber 30. The lower chamber 30 is connected to the gas separation chamber, by the conduit 17; to the boiler chamber 11, by the conduit 15; and to the absorber by the conduit 21 exactly the same as the corresponding chamber 30 of Figure 1 is connected to these various vessels. Likewise the upper chamber 28 is connected to the condenser by means of the conduit 36. The condenser C is connected directly to the evaporator E by means of the conduit 26, no jacket such as is shown at 27 in Figure 1 being employed in this construction.

The upper end of the chamber 28 of the rectifier is connected by means of conduit 41 to a number of auxiliary condensers 42, it being understood that there are as many auxiliary or reflux condensers 42 as there are tubes 29. The lower end of each condenser 42 is connected to a nozzle 43 by means of a conductor or conduit 44 which passes through the wall of the chamber 28. Each nozzle 43 discharges condensates from a condenser 42, on to a cone or funnel shaped portion 45 of a tube 29. Thus liquids fed through the nozzles 43 trickle downwardly through the tubes 29 in counterflow to the passage of gases upwardly therethrough.

In the arrangements of the rectifiers of Figures 1 and 2 it probably will be desirable to insulate the tubes 29 as well as the chamber 30. It may be desirable in some cases to insulate the chamber 28, also. At any rate, at least, in the arrangement of Fig. 2, the formation of the condensate necessary for the proper operation of the rectifier may take place practically entirely in the auxiliary or reflux condensers. Due to the fact that vapor is passing to the main condenser C as well as to the auxiliary reflux condensers it may be very important that the resistance of the condensers be properly proportional or that some metering device such as the valves indicated at 35 in Figure 1 and at 46 in Figure 2, be provided in order to proportion the quantity of fluid refluxed even though the condensers 33 or 42 are exposed to various temperature conditions in the atmosphere.

In the arrangement of Figure 2 it will be seen that means has been provided enabling the reflux liquid from the condensers 42 to be equally distributed into the vertical tubes 29 of the rectifier. If so desired, however, different amounts of reflux liquid may be fed to the tubes 29 merely by adjusting the valves 46.

Referring now to Figure 3, it will be seen that a refrigerating system of the type in which no inert gas is employed is there disclosed. Likewise, a different form of rectifier from that of Figures 1 and 2 is illustrated.

The refrigerating system of Figure 3 is illustrated as consisting of an absorber A, an evaporator E, a condenser C, a receiver O, valves V, a heat exchanger X, an aqua ammonia pump P, all of the usual construction together with a rectifier R, an analyzer L, and a conduit F for the return of condensate (reflux) to the rectifier constructed in accordance with the present invention. The various parts mentioned are connected by conduits as shown to form a complete refrigerating system. Other devices which may be employed to facilitate the usual operation or regulation, but are not essential to the complete description of the inventions are not shown, but may be incorporated into the system.

The vapor formed in evaporator E upon the transfer of heat from the body or material to be cooled to the refrigerant is conducted by conduit 24 to the absorber A where it is absorbed into the absorption solution. The strong aqua, if for example ammonia is the refrigerant and water the solvent, is pumped from the absorber by the pump P through the conduit 21, a portion of which is in heat exchange with conduit 18, to the analyzer-rectifier column L, R entering at the point Z which will be referred to later. The strong aqua flows downwardly against an ascending current of vapor into the boiler or generator B in which the solution is heated and the refrigerant vapor expelled together with a certain quantity of vapor of the solvent. The solvent now considerably diminished in concentration of refrigerant flows through the conduit 18 which is in heat exchange for a portion of its length with conduit 21, to the absorber where the solution is again concentrated and circulated according to the cycle just described. The regulating valve V regulates the quantity of solution flowing to the absorber which is at a lower pressure than the boiler B.

The vapor expelled in the generator B flows upwardly in the analyzer-rectifier column L, R against a descending stream of liquid for the purpose of removing the solvent, for instance water from the refrigerant vapor according to the principles of the present invention which will be described in detail later. The column may contain a series of plates, rings or the equivalent. The vapor is conducted from the top of the column by the conduit 36 to the condenser in which the vapor is cooled and liquefied. From the condenser, the condensate flows to the receiver O whence the greater portion of it flows through the conduit 26 and the expansion valve V to the evaporator E where it is vaporized with the production of cold.

A smaller portion of the condensate flows from the receiver through the conduit F and the metering valve M to the top of the rectifier at the point Y. The receiver, or the condenser if no receiver is employed, may be above the point Y so that a head is created sufficient to force the condensate into the rectifier; otherwise a pump or other means may be employed. Since each of the plates of the rectifier of Figure 3 holds liquid, as the vapor from the boiler passes over each a series of distillations take place from each plate with the ascending vapor becoming stronger and stronger and the descending liquid becoming weaker and weaker in the more volatile constituent.

The principle of operation of the present invention is based upon the fact that the condensate formed upon condensation of a vapor is necessarily richer in volatile component than the solution from which the vapor was evolved. Therefore this condensate cannot be in equilibrium with the vapor arising from the boiler, and if brought into contact with it some interaction must take place. It is evident that this interaction must involve the condensation from the vapor rising from the boiler of part of the less volatile component with evolution of new vapor richer in the more volatile component. The heat of condensation thus set free tends to raise the temperature of the liquid, but since it is already at its boiling point there results a new vapor in equilibrium with the solution from which it rises.

The quantity of vapor from the rectifier will be the greatest when there is no reflux, but under these circumstances no fractionation would occur in the column, and while the thermal efficiency would be a maximum, the separation efficiency would be zero. Working against thermal efficiency is separation efficiency. If for given conditions the composition of the solution from the absorber entering at Z, Figure 3, for example, is fixed the composition of the vapor in equilibrium with it at Z is constant. Likewise if the quantity and composition of the vapor to the condenser is fixed, then the composition of the reflux at Z is dependent upon the quantity of the reflux. The larger the quantity of reflux, other things being equal, the more nearly will the composition of the reflux at Z approach that of the vapor in equilibrium with the solution entering at Z, and the smaller the amount of reflux the more nearly will its composition approach the composition of the entering solution as a limiting value. At any point $n$ in the column the composition of the reflux to a lower point $n_1$ is a function of the vapor composition at the point $n$.

It is evident that the separation in the column between $n$ and the point below will be the greater, the greater the difference between the composition of the reflux at $n$ and the vapor at the point $n_1$ or in other words, for a given value of the vapor composition at $n_1$ the composition (ammonia content) of the reflux from point $n$, should be as large as possible. Since the composition of the reflux will be the higher, the larger the quantity of reflux, the greatest efficiency of separation is obtained when the reflux is a maximum throughout the column. Hence the entire reflux is preferably returned through the entire column. Likewise it may be desirable to insulate the column carefully to prevent heat losses to the outside and to avoid condensation occuring within the column itself. The separation of refrigerant and absorbent then takes place substantially adiabatically. The height of a fractionating column or the number of plates required may be less, the greater the ratio of reflux to condensed refrigerant, and conversely the greater the height or number of plates, the less may be the necessary reflux ratio for a required or desired set of operating conditions. However, for an infinite height or number of plates there will be a definite minimum reflux ratio below which it is not possible to obtain the desired separation.

Since in the construction of absorption refrigerating apparatus the proper size of rectifier may not be arrived at precisely or it may be desired to have the apparatus operate over a range of conditions for which different reflux ratios are desirable, it is possible according to the present invention to vary or regulate the quantity of reflux by the metering valves shown or by adjusting the liquid head or force according to the proportionate size of the conduits.

The principle of operation of the analyzer shown at 30 in Figures 1 and 2 and at L in Fig. 3 is analogous to that just described for the rectifier. In Figure 3, the operation is complicated by the fact that under a given set of conditions, while the rate of flow of vapor is substantially the same for all portions of the column the reflux passing in the opposite direction is increased at the point of entrance Z by the entering solution. For a given total height of column, the point Z may be the lower the greater the reflux. Hence for a fixed position of Z a continuity of operation both above and below the point Z may be obtained by regulating the quantity of reflux in accordance with the principles of the present invention.

While only a few embodiments of the present invention have been disclosed herein it is obvious that many changes may be made and that various features of the several figures are interchangeable. The invention is applicable to all types of absorption refrigerators and may be used to particular advantage wherever low temperatures are desired and in single as well as two stage systems. The invention is of course not limited to the constructional details shown and it is contemplated employing various other arrangements suitable for carrying out the principle, as, for example the construction disclosed in the copending application of R. S. Nelson and W. C. Davidson, Serial No. 693,696 filed Oct. 16, 1933. The returns from the reflux condensers of Fig. 2 of the present application may be connected to the rectifier at different heights as broadly claimed in said copending case.

Various other changes may be made without departing from the spirit of the invention or the scope of the annexed claims.

I claim:

1. In absorption refrigerating apparatus, a rectifier for removing absorption liquid vapor from refrigerant vapor, having a plurality of vertically disposed tubes, means for passing a mixture of refrigerant vapor and absorption liquid vapor upwardly through said tubes, a main condenser, an auxiliary reflux condenser, means for conveying vapor to the condensers, means for conveying condensate from the reflux condenser to the top of the vertically disposed tubes whereby the same may trickle downwardly therethrough and present a film of the liquid to intimate contact with the upwardly flowing vapor and means for metering the flow of vapor to the reflux condenser to control the amount of condensate conveyed to said tubes.

2. A continuous absorption refrigerating apparatus including a boiler, an evaporator, a main condenser, a rectifier including conduit means for bringing vapor leaving the boiler in intimate contact with a liquid, an auxiliary, reflux condenser, means for conveying vapor from said rectifier to said main condenser, means for conveying liquid from the main condenser into heat transfer relation with said conduit means, means for conveying vapor from said last mentioned means to said reflux condenser and for conveying liquid therefrom to said evaporator and means for conveying liquid from the reflux condenser to said conduit means and for causing it to come in intimate contact with the vapor flowing therethrough.

3. A continuous absorption refrigerating apparatus including a boiler, an evaporator, a main condenser, a rectifier including conduit means for bringing vapor leaving the boiler in intimate contact with a liquid, an auxiliary, reflux condenser, means for conveying vapor from said rectifier to said main condenser, means for conveying liquid from the main condenser into heat transfer relation with said conduit means, means for conveying vapor from said last mentioned means to said reflux condenser and for conveying liquid therefrom to said evaporator, a metering device for regulating the flow of vapor to said reflux condenser and thus controlling the amount of liquid which condenses therein.

4. A continuous absorption refrigerating apparatus including a boiler, a main condenser, an evaporator, a rectifier for removing absorption liquid vapor from the refrigerant vapor flowing from the boiler to the condenser, an auxiliary reflux condenser, means for conveying vapors from said rectifier to said main condenser and to said reflux condenser, means for conducting liquid from the main condenser to the evaporator, and means for conducting liquid from the reflux condenser back to said rectifier, said rectifier being arranged to bring the liquid and vapors flowing therethrough into intimate contact.

5. A continuous absorption refrigerating apparatus including a boiler, a main condenser, an evaporator, a rectifier for removing absorption liquid vapor from the refrigerant vapor flowing from the boiler to the condenser, an auxiliary reflux condenser, means for conveying vapors from said rectifier to said main condenser and to said reflux condenser, means for metering the flow of the vapors to control the proportion of vapors flowing to the main condenser and to the auxiliary condenser, means for conducting liquid from the main condenser to the evaporator, and means for conducting liquid from the reflux condenser back to said rectifier, said rectifier being arranged to cause the liquid and vapors to pass therethrough in counterflow and in intimate contact.

6. In absorption refrigerating apparatus, a rectifier system including a plurality of vertically disposed tubes, means for passing a mixture of refrigerant vapor and absorption liquid vapor upwardly through said tubes, a plurality of reflux condensers, one for each tube, means for conveying vapor from the tubes to said condensers and means for conveying liquid from each individual condenser to its individual tube and for causing the liquid to pass downwardly therethrough.

7. In absorption refrigerating apparatus, a rectifier system including a plurality of vertically disposed tubes, means for passing a mixture of refrigerant vapor and absorption liquid vapor upwardly through said tubes, a plurality of reflux condensers, one for each tube, means for conveying vapor from the tubes to said condensers, a plurality of metering devices, one for each of said condensers, for regulating the flow of vapor to said condensers, and means for conveying liquid from each individual condenser to its individual tube and for causing the liquid to pass downwardly therethrough while presenting a film to the vapors passing upwardly therethrough.

8. In absorption refrigerating apparatus an analyzer-rectifier system including two vessels, one above another, conduit means connecting said vessels, means for maintaining a liquid in the lower vessel, means for conveying refrigerant vapor and absorption liquid vapor into the lower vessel and for causing the same to bubble up through the liquid therein and pass upwardly through said conduit means, a reflux condenser, means for conducting vapor to said condenser and means for conducting liquid from said condenser to said conduit means and for causing the same to trickle downwardly therethrough in intimate contact with the vapor passing upwardly therethrough.

9. In absorption refrigerating apparatus, an analyzer-rectifier system including two vessels, one above another, conduit means connecting said vessels, means for maintaining a liquid in the lower vessel, means for conveying refrigerant vapor and absorption liquid vapor into the lower vessel and for causing the same to bubble up through the liquid therein and pass upwardly through said conduit means, a reflux condenser, means for conducting vapor to said condenser, means for conducting liquid from said condenser to said conduit means and for causing the same to trickle downwardly therethrough in intimate contact with the vapor passing upwardly therethrough and means for metering the flow of vapor to said reflux condenser to control the amount of liquid condensing therein.

10. In an absorption refrigerating system, a boiler, an evaporator and an arrangement for conveying fluid from the boiler to the evaporator and including a rectifier for separating absorbent vapor from refrigerant vapor, means for removing vapor from the rectifier and condensing the same and means for returning some of the condensate to the rectifier and conveying the remainder to the evaporator, the arrangement being such that the portion of the condensate returned to the rectifier has a higher concentration than that conveyed to the evaporator.

RUDOLPH S. NELSON.